(12) United States Patent
Olien et al.

(10) Patent No.: US 9,983,672 B2
(45) Date of Patent: May 29, 2018

(54) ELECTROSTATIC HAPTIC ACTUATOR AND USER INTERFACE WITH AN ELECTROSTATIC HAPTIC ACTUATOR

(71) Applicant: IMMERSION CORPORATION, San Jose, CA (US)

(72) Inventors: Neil Olien, Montreal (CA); Michael A Greenish, Gryon (CH)

(73) Assignee: Immersion Corporation, San Jose, CA (US)

(*) Notice: Subject to any disclaimer, the term of this patent is extended or adjusted under 35 U.S.C. 154(b) by 21 days.

(21) Appl. No.: 15/009,529

(22) Filed: Jan. 28, 2016

(65) Prior Publication Data

US 2016/0224115 A1 Aug. 4, 2016

Related U.S. Application Data

(60) Provisional application No. 62/110,299, filed on Jan. 30, 2015.

(51) Int. Cl.
*G06F 3/01* (2006.01)
*G06F 3/0488* (2013.01)
*G06F 3/041* (2006.01)

(52) U.S. Cl.
CPC ............ *G06F 3/016* (2013.01); *G06F 3/041* (2013.01); *G06F 3/04883* (2013.01)

(58) Field of Classification Search
CPC ....... G06F 3/016; G06F 3/041; G06F 3/04883
See application file for complete search history.

(56) References Cited

U.S. PATENT DOCUMENTS

| 6,680,729 | B1 | 1/2004 | Shahoian et al. |
| 8,174,372 | B2* | 5/2012 | da Costa ................. G06F 3/016 340/407.1 |
| 9,235,265 | B2 | 1/2016 | Karamath et al. |
| 2006/0028095 | A1 | 2/2006 | Maruyama |
| 2010/0231550 | A1 | 9/2010 | Cruz-Hernandez et al. |

(Continued)

OTHER PUBLICATIONS

Patent Cooperation Treaty, International Search Report and Written Opinion, International Application No. PCT/US2016/015381 dated Jul. 4, 2016.

*Primary Examiner* — Amare Mengistu
*Assistant Examiner* — Jennifer Zubajlo
(74) *Attorney, Agent, or Firm* — Kilpatrick Townsend & Stockton LLP

(57) ABSTRACT

One illustrative electrostatic actuator disclosed herein includes a first electrode, a second electrode, a first insulation layer between the first electrode and the second electrode, a first resilient material between the first electrode and the second electrode, a third electrode, a second insulation layer between the second electrode and the third electrode, and a second resilient material between the second electrode and the third electrode. The first electrode and the third electrode receive power from a power supply and responsively generate a first polarity. The second electrode receives power from the power supply and responsively generates a second polarity that is opposite the first polarity. The first polarity and the second polarity generate a first attractive force between the first electrode and the second electrode and a second attractive force between the second electrode and the third electrode. The electrostatic actuator may be part of a user interface.

30 Claims, 6 Drawing Sheets

(56) References Cited

U.S. PATENT DOCUMENTS

| | | | |
|---|---|---|---|
| 2012/0268412 A1 | 10/2012 | Cruz-Hernandez et al. | |
| 2012/0287068 A1* | 11/2012 | Colgate | G06F 3/016 345/173 |
| 2012/0306790 A1* | 12/2012 | Kyung | G06F 3/016 345/173 |
| 2014/0333573 A1* | 11/2014 | Hong | G06F 3/016 345/174 |
| 2016/0004309 A1 | 1/2016 | Modarres et al. | |
| 2016/0124555 A1* | 5/2016 | Hong | G06F 3/016 345/173 |

\* cited by examiner

ELECTROSTATIC HAPTIC ACTUATOR AND USER INTERFACE WITH AN ELECTROSTATIC HAPTIC ACTUATOR

REFERENCE TO RELATED APPLICATION

This application claims priority to U.S. Provisional Patent Application No. 62/110,299, entitled "Electrostatic Haptic Actuator and User Interface with an Electrostatic Haptic Actuator," filed Jan. 30, 2015, the entirety of which is hereby incorporated by reference herein.

FIELD

The present disclosure is related to an electrostatic actuator, and a user interface with an electrostatic haptic actuator.

BACKGROUND

Electrostatic actuators operate via an attractive force that is created when charges of opposite polarity are separated by a distance, in accordance with Coulomb's law. When a voltage is applied across two electrodes separated by a distance, opposite charges are generated on the electrodes, thereby creating an attractive force. The attractive force is proportional to quantity of the charge on the electrodes and inversely proportional to the square of the distance between the charged electrodes. As distance between the charged electrodes is decreased, the force is increased.

Using known electrostatic actuators in user interface implementations with touch screen displays, for example, may be limited in terms or providing satisfactory haptic feedback to the user due to the large mass of the touch screen display (e.g. 600-800 grams) and the high voltage (e.g. >3,000 Volts) that may be needed by an electrostatic actuator that has the same surface area as the touch screen display.

SUMMARY

It is desirable to use an electrostatic actuator having a thin profile but with higher power density and/or lower overall power consumption in a user interface to provide haptic effects to a user of the user interface.

Embodiments of the present disclosure comprise an electrostatic haptic actuator and a user interface with an electrostatic haptic actuator. In one embodiment, a device of the present disclosure may comprise an electrostatic haptic actuator. The electrostatic haptic actuator may comprise a first electrode, a second electrode, a first insulation layer between the first electrode and the second electrode, and a first resilient material between the first electrode and the second electrode. The electrostatic haptic actuator may also comprise a third electrode, a second insulation layer between the second electrode and the third electrode, and a second resilient material between the second electrode and the third electrode. The device may comprise a power supply operatively connected to the first electrode, the second electrode, and the third electrode for generating a first polarity on the first and third electrodes and a second polarity that is opposite the first polarity on the second electrode. The device may comprise a controller in signal communication with the power supply or with a switch. The controller may be configured to cause the power supply to be electrically connected to the first electrode, the second electrode, and the third electrode to generate a first attractive force between the first electrode and the second electrode, and a second attractive force between the second electrode and the third electrode.

In another embodiment, an electrostatic haptic actuator of the present disclosure may comprise a first electrode, a second electrode, a first insulation layer between the first electrode and the second electrode, and a first resilient material between the first electrode and the second electrode. The electrostatic haptic actuator may also comprise a third electrode, a second insulation layer between the second electrode and the third electrode, and a second resilient material between the second electrode and the third electrode. The first electrode and the third electrode may be configured to receive power from a power supply and responsively generate a first polarity. The second electrode may be configured to receive power from the power supply and responsively generate a second polarity that is opposite the first polarity. The first polarity and the second polarity may generate a first attractive force between the first electrode and the second electrode and a second attractive force between the second electrode and the third electrode.

In another embodiment, a method of the present disclosure may comprise receiving, from a touch sensor, a sensor signal associated with an input. The method may comprise determining a haptic effect based at least in part on the sensor signal. The method may comprise causing a power source to transmit power to an electrostatic haptic actuator. The electrostatic haptic actuator may be configured to receive the power and output the haptic effect. The electrostatic haptic actuator may comprise a first electrode, a second electrode, a first insulation layer between the first electrode and the second electrode, and a first resilient material between the first electrode and the second electrode. The electrostatic haptic actuator may also comprise a third electrode, a second insulation layer between the second electrode and the third electrode, and a second resilient material between the second electrode and the third electrode. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

These and other aspects, features, and characteristics of the present subject matter, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the present subject matter. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
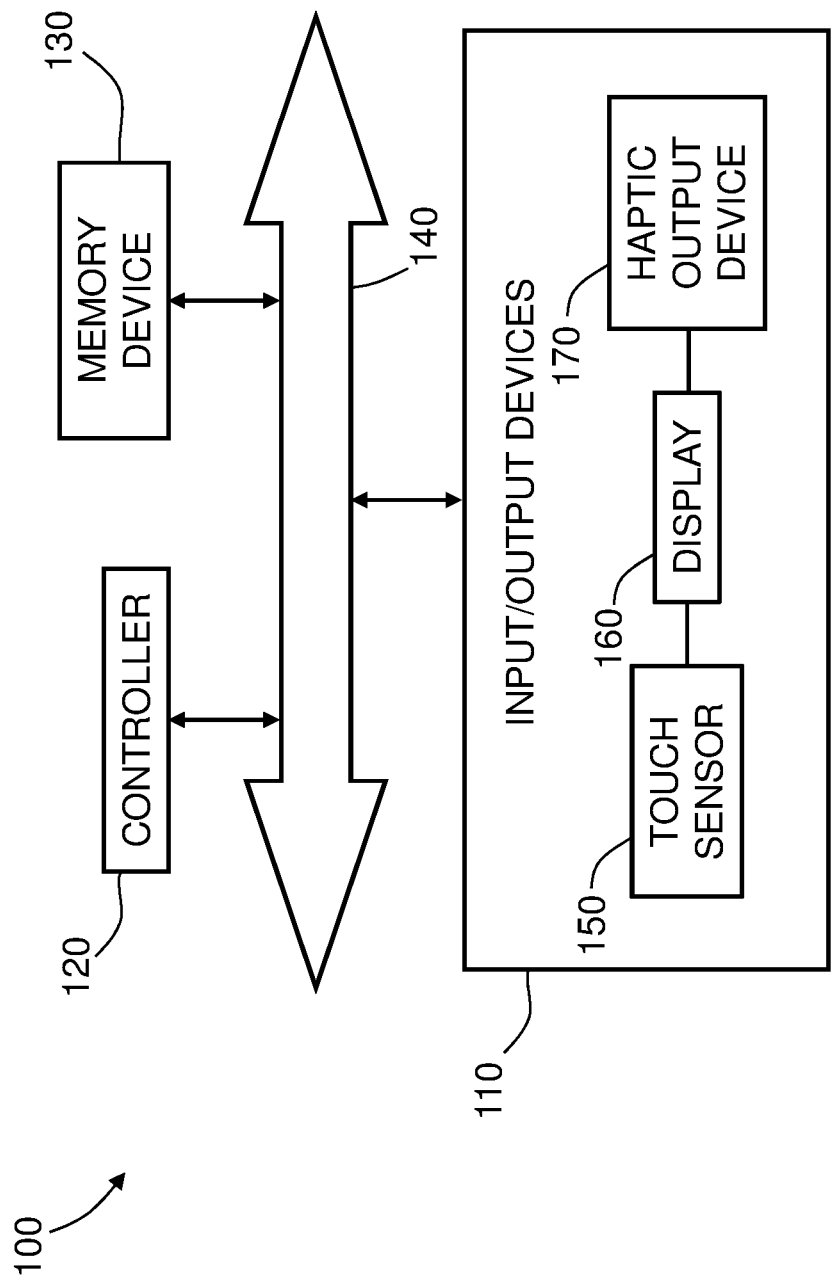
FIG. 1 shows a user interface in accordance with an embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of an Electrostatic Haptic Actuator and User Interface with an Electrostatic Haptic Actuator One illustrative embodiment of the present disclosure includes an electronic device, such as a smartphone. The electronic device includes a user interface device, such as a touch-screen display.

The electronic device includes a haptic output device. The haptic output device includes a first electrode positioned substantially parallel to, and spaced apart from, a second electrode. The haptic output device also includes a third electrode positioned substantially parallel to, and spaced apart from, the second electrode. In the illustrative embodiment, a first resilient material is positioned between the first electrode and the second electrode. A second resilient material is positioned between the second electrode and the third electrode. Additionally, a first dielectric/insulator layer may be positioned between the first electrode and the second electrode, and a second dielectric/insulator layer may be positioned between the second electrode and the third electrode.

In the illustrative embodiment, the electronic device causes a power supply to transmit power to the electrodes (e.g., by operating the power supply or a switch associated with the power supply) to generate a haptic effect. The power supply may be electrically coupled to the first and third electrodes such that power transmitted to the first and the third electrodes generates a positive charge on the first and third electrodes. The power supply may be electrically coupled to the second electrode such that power transmitted to the second electrode generates a negative charge on the second electrode. The charges on the electrodes may cause the first and third electrodes to be attracted to the second electrode. This attraction may cause the first and third electrodes to move toward the second electrode, compressing the first resilient material disposed between first and second electrode and the second resilient material disposed between the second and third electrode. In an embodiment, the electronic device may subsequently cause the power supply to stop transmitting power to the electrodes. This may cause the attractive forces among the electrodes to dissipate, allowing the resilient materials to decompress. Decompression of the resilient materials may cause the electrodes to move back to their respective initial resting positions and/or oscillate. The user may perceive one or more movements of the electrodes as a haptic effect. For example, repeated movement of the electrodes can generate a vibration perceivable by the user through a housing of the electronic device. In embodiments, the electronic device can cause power to be transmitted to, and removed from, any combination of the electrodes in any sequence to generate one or more haptic effects.

In the illustrative embodiment, the electronic device is configured to cause the haptic output device to output haptic effects in response to a user interaction with the user interface device. For example, the electronic device may detect a user interacting with a virtual object, such as a virtual weapon, output on a touch-screen display. The virtual object may be output as part of a video game executing on the electronic device. In an embodiment, the electronic device is configured to cause the haptic output device to output a haptic effect, such as a vibration, in response to the user interaction. The haptic effect may simulate, for example, gunfire from the virtual weapon.

Illustrative Systems for an Electrostatic Haptic Actuator and User Interface with an Electrostatic Haptic Actuator FIG. 1 shows a user interface 100 in accordance with an embodiment. The user interface 100 may be part of any electronic device, such as a desktop computer, laptop computer, electronic workbook, electronic handheld device (such as a mobile phone, smartphone, gaming device, personal digital assistant ("PDA"), portable e-mail device, portable Internet access device, calculator, etc.), kiosk (such as an automated teller machine, ticket purchasing machine, etc.), printer, point-of-sale device, game controller, wearable device, or other electronic device, such as an electronic device that is part of a vehicle, such as a touch screen, touch pad, or button panel.

As illustrated, the user interface 100 includes input/output devices 110, a controller 120, and a memory device 130. The input/output devices 110 may be interconnected to the controller 120 and/or the memory device 130 via a bus 140 such that the input/output devices 110 are in signal communication with the controller 120. The bus 140 may include wired communication links, wireless communication links, and/or other communication links between the controller 120 and the input/output devices 110. Signals may be output by the input/output devices 110 to the controller 120 and signals may be output by the controller 120 to the input/output devices 110.

The input/output devices 110 include at least one user input device configured to receive an input from the user of the user interface 100. In an embodiment, the user input device may include a touch sensor 150 configured to sense (e.g., detect) an input from the user. The touch sensor 150 may be configured to detect gestures from the user, such as tapping, sliding, rubbing, or pressing a surface of the touch sensor 150. Several technologies may be used for this purpose, such as capacitive or resistive sensing, force-sensitive resistors, or optical switches, for example. In an embodiment, the touch sensor 150 may be part of a touch pad. In an embodiment, the touch sensor 150 may be part of a touch screen that overlays a display 160 configured to output and display information to the user. In an embodiment, the touch sensor 150 and the display 160 may be combined into a touch screen device.

The input/output devices 110 may include an audio output device (not shown), such as a speaker, that is configured to provide audio feedback to the user. In an embodiment, the input/output devices 110 may include other types of user input devices, such as a button, a rotary knob, or a joystick that may be manipulated by the user in order for the user to provide input to the user interface 100. Buttons, rotary knobs and joysticks may be used, for example, as user input devices in a variety of vehicles.

The input/output devices 110 also includes a haptic output device 170 configured to provide a haptic effect or feedback to the user as, for example, confirmation that the input was received by the user interface 100. The haptic output device 170 may include one or more actuators, driving circuitry, and a haptic engine configured to generate driving signals for the actuator(s).

The haptic feedback provided by the haptic output device 170 may be created with any of the methods of creating haptic effects, such as vibration, deformation, kinesthetic sensations, electrostatic or ultrasonic friction, etc. In an embodiment, the haptic output device 170 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electroactive polymers, such as ionic or electronic based electroactive polymers, shape member polymers, smart hydrogels, or shape memory alloys, a macrocomposite fiber actuator, an electrostatic actuator, an electrotactile actuator, a nanocomposite actuator, a pneumatic-based actuator and/or another type of actuator that provides a physical feedback such as vibrotactile feedback. The haptic output device 170 may include non-mechanical or non-vibratory devices such as those that use electrostatic friction (ESF), ultrasonic friction (USF), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. Multiple haptic output devices 170 may be used to generate different haptic effects, as discussed in further detail below. In an embodiment, the haptic output device 170 is an electrostatic haptic actuator, as described in further detail below.

In an embodiment, the haptic output device 170 may be integrated with the touch sensor 150 or be separate from the touch sensor 150. In an embodiment, the touch sensor 150 may also be configured to support the rendering of haptic effects by the haptic output device 170, such as the modulation of friction effects as a finger slides against the touch sensor 170. In an embodiment, multiple haptic output devices may be used to generate different haptic effects.

As illustrated in in FIG. 1, a memory device 130 may also be interconnected with the controller 120 and to the input/output devices 110 via the bus 140. The memory device 130 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 170 is to be driven, or other information for generating haptic effects.

The controller 120 may be a general-purpose or specific-purpose processor or microcontroller for managing or controlling the operations and functions of the user interface 100. For example, the controller 120 may be specifically designed as an application-specific integrated circuit ("ASIC") to control output signals to the display 160 to provide visual information and to the haptic output device 170 to provide haptic effects. The controller 120 may be configured to determine, based on predefined factors, the type(s) of haptic effect(s) to be generated, the order in which the haptic effects are generated, and the magnitude, frequency, duration, and/or other parameters of the haptic effects. The controller 120 may also be configured to provide streaming commands that can be used to drive the haptic output device 170 for providing a particular haptic effect. In some embodiments, the controller 120 may actually include a plurality of processors, each configured to perform certain functions within the user interface 100.

Figure 2:
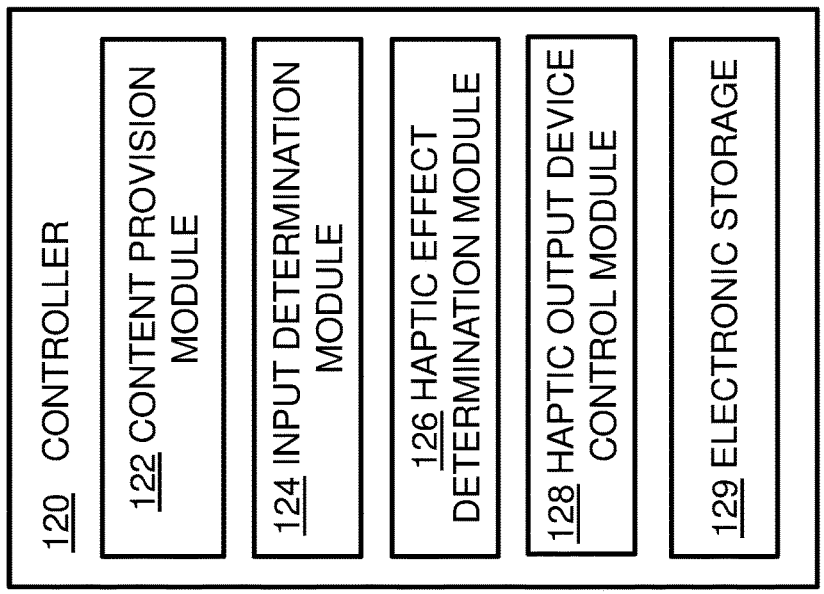
FIG. 2 shows an embodiment of the controller of FIG. 1.

FIG. 2 shows an embodiment of the controller 120 of FIG. 1. The controller 120 may be configured to execute one or more computer program modules. The one or more computer program modules may include one or more of a content provision module 122, an input determination module 124, a haptic effect determination module 126, a haptic output device control module 128, and/or other modules. The controller 120 may be configured to execute the modules 122, 124, 126, and/or 128 by software, hardware, firmware, some combination of software, hardware, and/or firmware, and/or other mechanisms for configuring processing capabilities on the controller 120.

It should be appreciated that although modules 122, 124, 126, and 128 are illustrated in FIG. 2 as being co-located within a single processing unit, in embodiments in which the controller 120 includes multiple processing units, one or more of modules 122, 124, 126, and/or 128 may be located remotely from the other modules. The description of the functionality provided by the different modules 122, 124, 126, and/or 128 described below is for illustrative purposes, and is not intended to be limiting, as any of the modules 122, 124, 126, and/or 128 may provide more or less functionality than is described. For example, one or more of the modules 122, 124, 126, and/or 128 may be eliminated, and some or all of its functionality may be provided by other ones of the modules 122, 124, 126, and/or 128. As another example, the controller 120 may be configured to execute one or more additional modules that may perform some or all of the functionality attributed below to one of the modules 122, 124, 126, and/or 128.

The content provision module 122 is configured to control the provision of content to the user of the user interface 100 via the display 160. If the content includes computer generated images, the content provision module 122 is configured to generate the images and/or views for display to the user through the display 160. The content, or information from which the content is derived, may be obtained by the content provision module 122 from an electronic storage 129, which may be part of the controller 120, as illustrated in FIG. 2, or may be separate from the controller 120, such as part of the memory device 130 illustrated in FIG. 1.

The input determination module 124 is configured to receive an input signal from the touch sensor 150. The input signal is generated when the touch sensor 150 detects an input from a user of the user interface 100. For example, the touch sensor 150 can transmit an input signal to the input determination module 124 in response to user input. In an embodiment, the input determination module 124 may be configured to determine whether the sensed input is an intentional input or merely an inadvertent touch to the touch sensor 150 by comparing the strength of the input signal to a predetermined threshold strength that corresponds to an intentional input.

In an embodiment, the input determination module 124 is also configured to determine what was intended by the user when providing an input to the touch sensor 150. For example, the user may touch a certain location of the touch sensor 150 or provide a particular gesture to the touch sensor 150 that indicates that a certain function is to be performed by the user interface 100. The input determination module 124 may be programmed with a library of predetermined gestures and/or touch locations on the touch sensor 150 so that when the user touches a particular location on the touch sensor 150 or provides a gesture to the touch sensor 150, the input determination module 124 may determine a corresponding output. For example, in an embodiment in which the user interface 100 is part of a smartphone, the user may draw a symbol on the touch sensor 150 with a finger and the input determination module 124 may determine that the drawn symbol corresponds to a particular command, such as unlocking the smartphone so that the user may freely interact with the smartphone.

Additionally or alternatively, the input determination module 124 may be configured to receive a signal from a remote device, such as a timer, that provides an input to indicate that a haptic effect is to be generated. In an embodiment, the input determination module 124 is also configured to output a signal to the haptic effect determination module 126 and/or the haptic output device control module 128 so that a haptic effect, for example verifying that the input has been detected and/or accepted, may be provided to the user.

The haptic effect determination module 126 is configured to determine the haptic effect or sensation to be generated by the haptic output device 170 and output to the user of the user interface 100. Determining the haptic effect may include determining the type of haptic effect and one or more parameters of the haptic effect, such as amplitude, frequency, duration, etc.

The haptic output device control module 128 is configured to control the haptic output device 170 to generate the haptic effect determined by haptic effect determination module 126. This includes communicating a haptic output signal generated by the controller 120 to the haptic output device 170 (e.g., via the bus 140). In an embodiment, at least a portion of the functionality attributed to the haptic output device control module 128 may be disposed in a processor carried by the haptic output device 170.

Figure 3:
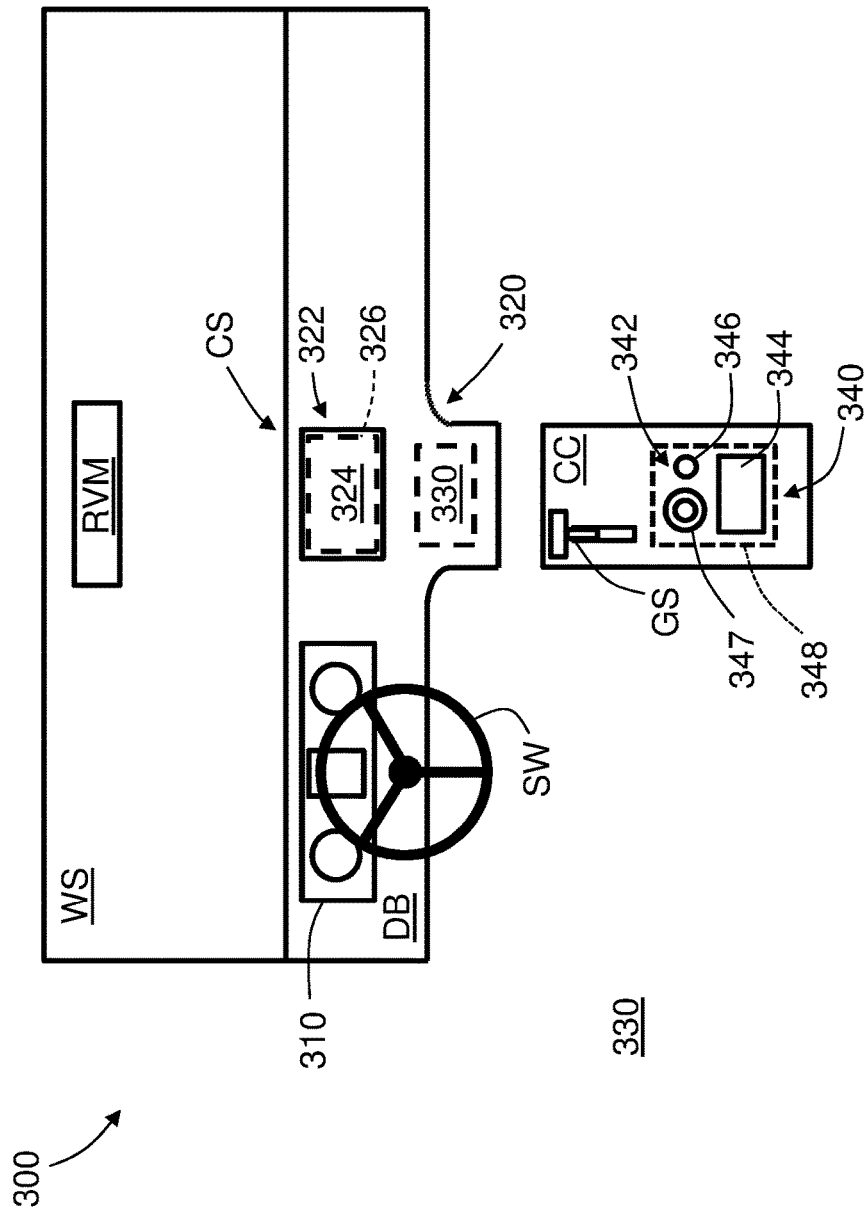
FIG. 3 shows an interior of a vehicle that includes embodiments of the user interface of FIG. 1.

FIG. 3 shows an interior of a vehicle 300 that includes embodiments of the user interface 100 of FIG. 1. As illustrated, the vehicle 300 includes a steering wheel SW that extends from a dashboard DB, a windshield WS that is located above the dashboard DB, a rearview mirror RVM positioned near a top and center of the windshield, a center stack CS in the center of the dashboard, a center console CC located between two front passenger seats (not shown), and a gear shift GS that extends from the center console CC. An instrument panel 310 is located in the dashboard DB behind the steering wheel SW relative to the position of the driver. The instrument panel 310 may be configured to display information with respect to the speed of the vehicle, an odometer, engine conditions of the vehicle, such as coolant temperature, fuel level, exterior environmental conditions, such as temperature, etc. The instrument panel 310 may include electronic and/or analog instrumentation. In an embodiment, the instrument panel 310 may be in the form of a display that electronically displays the information.

As illustrated in FIG. 3, a user interface 320, such as the user interface 100 illustrated in FIG. 1 and described above, may be located in the center stack CS. The user interface 320 includes input/output devices 322, which may include a display 324 configured to display images, such as maps as part of a global positioning system ("GPS"), as well as information with respect to a stereo system (not shown) in the vehicle, such as the radio station being listened to or song currently being played on the stereo system, etc. Other information with respect to the vehicle, such as temperature settings for the interior of the vehicle, etc., may also be displayed by the display 324 in the center stack CS. A touch screen having a touch sensor, such as the touch sensor 150 described above, may overlay or be part of the display 324. Additional input elements, such as buttons, may also be part of the input/output devices 322 of the user interface 320. A haptic output device 326 may be positioned beneath the display 324, or may overlay the display 324 in embodiments in which the haptic output device 326 is transparent or substantially transparent such that images displayed by the display may be viewed through the haptic output device 326. Although a controller 330, which may be the controller 120 illustrated in FIG. 1 and described above, is illustrated as being located in the center stack CS, the controller 330 may be located anywhere in the vehicle 300. The illustrated embodiment is not intended to be limiting in any way.

As also illustrated in FIG. 3, a second user interface 340 is located in the center console CC near the gear shift GS. The second user interface 340 may be located in another location that is still convenient for the user to manipulate without having to be distracted from driving the vehicle 300. For example, the second user interface 340 should be located at a position that is easy for the driver to reach without having to stretch. In an embodiment, the second user interface 340 or a portion of the user interface 340 may be located on the steering wheel SW, the dash board DB, the center stack CS, the driver's door, the driver's seat, etc. The illustrated embodiment is not intended to be limiting in any way.

The second user interface 340 includes input/output devices 342, which may include a rotary knob 346, which may also be pressed as a button, and/or a joystick 347 that may be manipulated by the user in order for the user to provide input. The input/output devices 342 also include a touch pad 344, which may include the touch sensor 150 described above, and a haptic output device 348 at least partially positioned below the touch pad 344.

In an embodiment, the haptic effects that are output by the haptic output device 348 of the user interface 340 may be provided as confirmation that an input (e.g., that was provided by the user to the input/output devices 342) has been received and/or an associated action will be implemented by the controller 330. Such a haptic effect may include a single pulse or series of pulses that is/are felt by the user as a vibration or vibrations.

Figure 4:
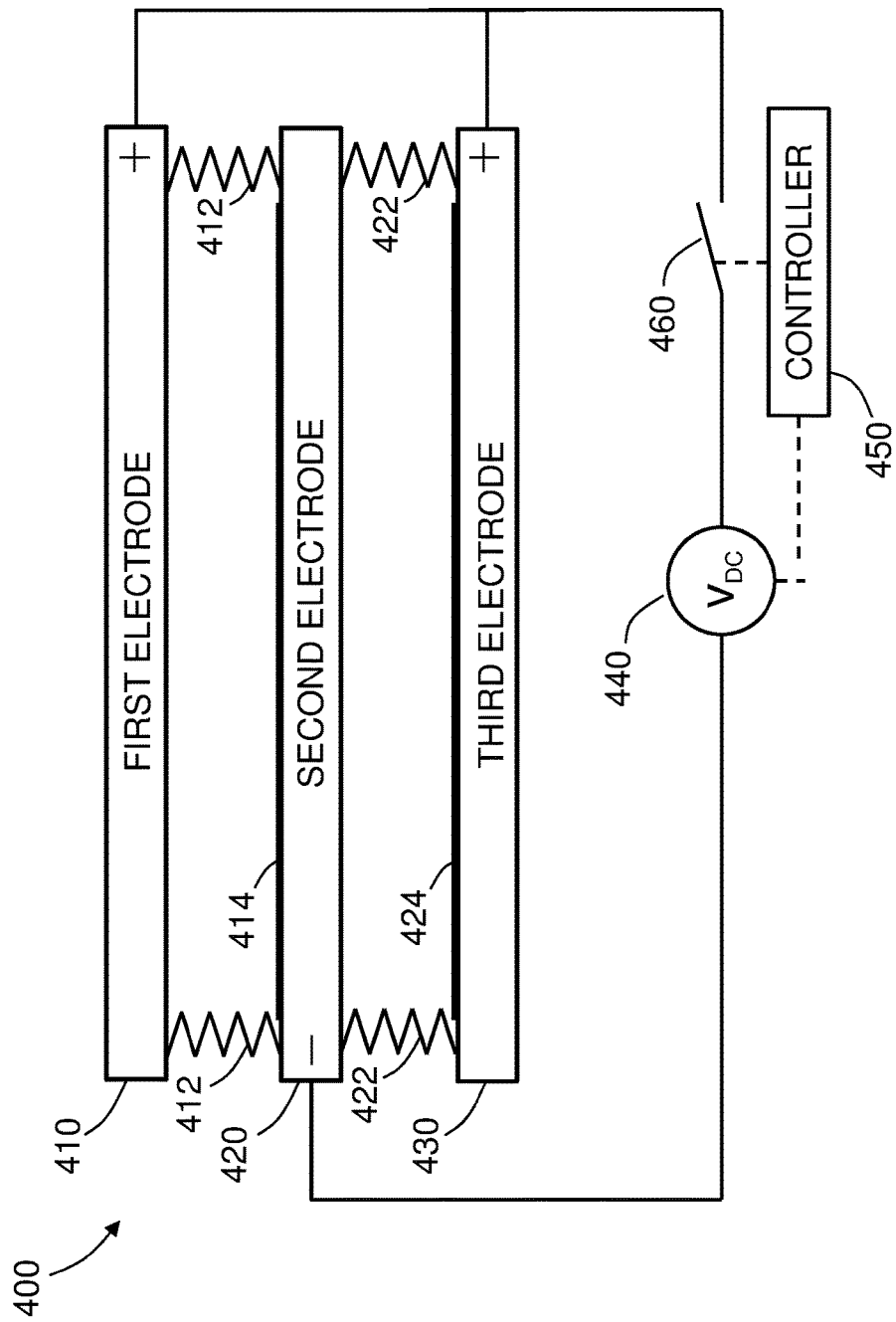
FIG. 4 shows an embodiment of an electrostatic haptic actuator, which may be used as part of the user interfaces of FIGS. 1 and 3.

FIG. 4 shows an embodiment of an electrostatic haptic actuator 400 that may be used as part of the user interfaces 100, 320, 340 (e.g., as the haptic output devices 170, 326, 348) of FIGS. 1 and 3. As illustrated, the electrostatic haptic actuator 400 includes a first electrode 410, a second electrode 420 spaced from the first electrode 410 to form a gap (e.g., an air gap) there-between, and a third electrode 430 spaced from the second electrode 420 on an opposite side of the second electrode 420 as the first electrode 410 to form a gap there-between. The electrodes 410, 420, 430 may be in the form of metal plates. Additional electrodes/plates may be used in embodiments. For example, an embodiment can include a fourth electrode spaced from the first electrode 410 or the third electrode 430 to form a gap there-between. The illustrated embodiment is not intended to be limiting in any way.

As illustrated in FIG. 4, a resilient material 412 is positioned in the gap in between the first electrode 410 and the second electrode 420. Although FIG. 4 schematically depicts the resilient material 412 as two separate structures that are spaced apart, in an embodiment, the resilient material 412 may partially or completely fill the gap between the first electrode 410 and the second electrode 420. The configuration of the resilient materials 412, 422 shown in FIG. 4 is not intended to be limiting in any way. A dielectric/insulator layer 414 is also positioned in between the first electrode 410 and the second electrode 420. Although the dielectric/insulator layer 414 is illustrated as overlaying the second electrode 420, in an embodiment, the dielectric layer may overlay an underside of the first electrode 410, or may be positioned in another arrangement between the first electrode 410 and the second electrode 420.

As shown in FIG. 4, a resilient material 422 is also positioned in the gap in between the second electrode 420 and the third electrode 430, and a dielectric/insulator layer 424 is positioned in between the second electrode 420 and the third electrode 430. In an embodiment, the resilient material 412 may be part of the dielectric/insulator layer 414 and/or the resilient material 422 may be part of the dielectric/insulator layer 424. In such an embodiment, only one layer of material may be positioned in the gap between the first electrode 410 and the second electrode 420, and/or only one layer of material may be positioned in the gap in between the second electrode 420 and/or the third electrode 430. The illustrated embodiment is not intended to be limiting in any way. In an embodiment, the layer(s) of material between the electrodes may fill any gap between the electrodes so that little to no air is present between the electrodes 410, 420, 430.

The resilient materials 412, 422 may be any type of structure that is deformable when subjected to a force, and returns to its initial shape after the removal of the force. For example, in an embodiment, the resilient material 412, 422 may include one or more coil springs. In an embodiment, the resilient material 412, 422 may include woven cloths that extend through at least a portion of the gaps and may be compressed when subjected to a force and expands to its original shape after the removal of the force. In an embodiment, the resilient materials 412, 422 may have the same spring constants (k). In an embodiment, the resilient materials 412, 422 may have different spring constants. For example, the resilient material 412 may have a first spring constant ($k_1$) and the resilient material 422 may have a second spring constant ($k_2$) that is greater than or less than the first spring constant ($k_1$). In an embodiment, the spring constant of the resilient materials 412, 422 may be selected for a specific resonant frequency.

The dielectric/insulator layers 414, 424 may be made from any suitable dielectric material that also functions as an insulator between the electrodes 410, 420, 430. In an embodiment, separate dielectric and insulating layers may be used. For example, in an embodiment, a dielectric/insulator layer 414 includes one layer of a dielectric material that is not an insulating material and one layer of an insulating material that is not a dielectric material may be used. The illustrated embodiment is not intended to be limiting in any way.

The first electrode 410, the second electrode 420 and the third electrode 430 are connected to a power supply 440 via wires, such as copper wires. The power supply 440 is in signal communication with a controller 450, such as the controller 120 described above. The controller 450 may provide signals to the power supply 440 that indicate when the power supply 440 should turn on and off. The controller 450 may additionally or alternatively be in signal communication with a switch 460 that is located between the power supply 440 and, for example, the first electrode 410 and the third electrode 430. The controller 450 may provide signals to the switch 460 that indicate when the switch 460 should move from an open condition, as illustrated in FIG. 4, to a closed position to complete the circuit illustrated in FIG. 4. In an embodiment, the switch 460 may be positioned between the power supply 440 and the second electrode 420.

In an embodiment, the controller 450 operates the power supply 440 and/or the switch 460 to operate the electrostatic haptic actuator 400. For example, in response to the controller 450 providing a signal to the power supply 440 to turn on and/or providing a signal to the switch 460 to move from an open position to a closed position, power can be transmitted to the electrodes 410, 420, and 430. The power can generate a positive charge on the first electrode 410 and the third electrode 430 and a negative charge on the second electrode 420. The charges on the electrodes cause the first electrode 410 to be attracted to the second electrode 420 (and/vice-versa), and the second electrode 420 to be attracted to the third electrode 430 (and vice-versa). This attraction can create forces that move the first electrode 410 and the second electrode 420 towards each other, and/or move the second electrode 420 and the third electrode towards each other.

Movement of the electrodes 410, 420, 430 also compresses the resilient materials 412, 422 located in between the respective pairs of electrodes 410, 420, 430. In response to the controller 450 providing a signal configured to turn off the power supply 440 and/or toggle the switch 460 from a closed position to the open position, the electrodes lose their respective charges and the forces generated by the attraction of the electrodes 410, 420, 430 dissipate. In response to the forces generated by the attraction of the electrodes 410, 420, and 430 dissipating, the resilient material 412 in between the first electrode 410 and the second electrode 420, and the resilient material 422 in between the second electrode 420 and the third electrode 430, decompress and move the electrodes 410, 420, 430 back to their respective initial resting positions. In an embodiment, the electrodes 410, 420, 430 may oscillate as they ultimately move back to their respective resting positions, which may generate a vibration. In an embodiment, the controller 450 can toggle the power supply 440 on and off, and/or the switch 460 between open and closed positions, multiple times at the same or different frequencies to generate different vibration patterns.

In an embodiment, different resilient materials may be used in one or both layers, such that a resilient material having a first spring constant ($k_1$) may be positioned in one area in between the first electrode 410 and the second electrode 420, and a different resilient material having a second spring constant ($k_2$) may be positioned in another area in between the first electrode 410 and the second electrode 420. Such an arrangement may provide a tilt effect due to the differences in spring constants when the electrostatic haptic actuator 400 is actuated. Any combination of resilient materials having different spring constants may be used in each of the layers.

In an embodiment, the controller 450 may transmit a signal configured to reverse the polarity of the second electrode 420 so that the second electrode 420 has the same polarity as the first electrode 410 and the third electrode 430. This may generate repelling forces between the first electrode 410 and the second electrode 420, and between the second electrode 420 and the third electrode 430. In an embodiment, the repelling forces may return the electrodes 410, 420, 430 to their initial resting positions. In an embodiment, the repelling forces may move the electrodes 410, 420, 430 beyond their initial resting positions, thereby causing the resilient materials 412, 422 to expand. The resilient materials 412, 422 may be configured to return the electrodes 410, 420, 430 to their initial resting positions when the controller 450 causes the power to be disconnected from the electrodes 410, 420, 430 and/or the switch 460 to move to the open position.

Although the power supply 440, the controller 450, and the switch 460 are illustrated as being part of the electrostatic haptic actuator 400, in an embodiment, the power supply 440, the controller 450, and/or the switch 460 may be separate from the electrostatic haptic actuator 400. For example, the power supply 440, the controller 450, and the switch 460 may be separate from the electrostatic haptic actuator 400 but included within an associated user interface. The illustrated embodiment is not intended to be limiting in any way.

Figure 5:
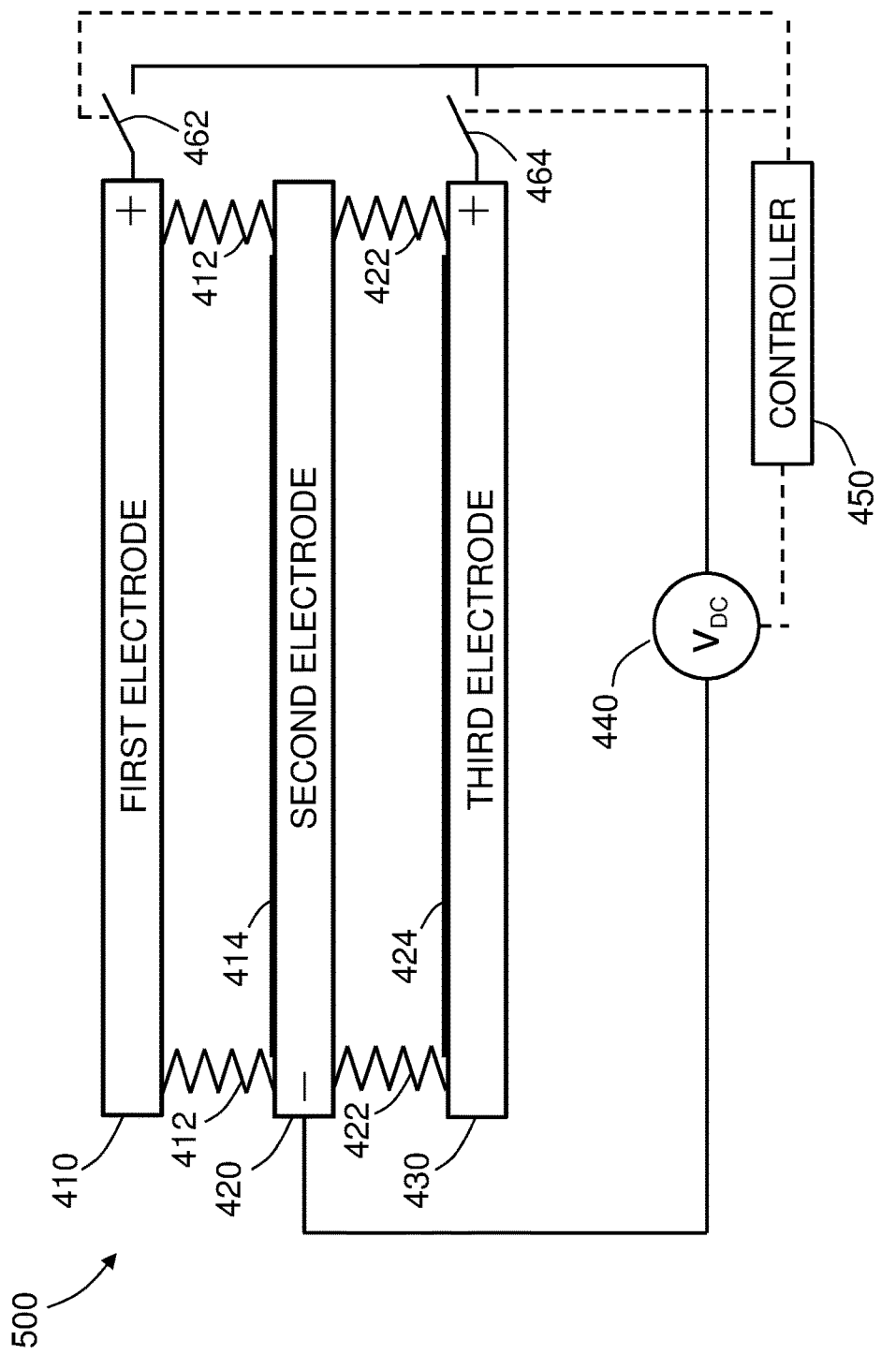
FIG. 5 shows another embodiment of an electrostatic haptic actuator.

FIG. 5 shows another embodiment of an electrostatic haptic actuator 500. The electrostatic haptic actuator 500 shown in FIG. 5 includes many of the same components as the electrostatic haptic actuator 400 illustrated in FIG. 4. But instead of having a single switch 460 in between the power supply 440 and the first electrode 410 and the third electrode 430, the electrostatic haptic actuator 500 illustrated in FIG. 5 includes a first switch 462 located between the power supply 440 and the first electrode 410, and a second switch 464 located between the power supply 440 and the third electrode 430. The switches 462, 464 can be operated to in series or in concert, which can allow the attractive forces between the electrodes to be generated in series or in concert. For example, the controller 450 may send a signal to the first switch 462 to close the first switch 462 and complete the circuit between the first electrode 410 and the second electrode 420 to generate an attractive force between the first electrode 410 and the second electrode 420. After a delay, which may be a very short delay, the controller 450 may then send a signal to the second switch 464 to close the second switch 464 and complete the circuit between the third electrode 430 and the second electrode 420 to generate an attractive force between the second electrode 420 and the third electrode 430. In an embodiment, the controller 450 may simultaneously send signals to the first switch 462 and the second switch 464 so that the switches 462, 464 close simultaneously and complete the circuit in the same manner the single switch 460 illustrated in FIG. 4 completes the circuit when closed. The controller 450 can operate the switches 464, 464 in any arrangement or configuration to generate haptic effects.

In an embodiment, the user interface 320 illustrated in FIG. 3 may include, for example, an 8" optically-bonded touch screen with a display 324, and the haptic output device 326 may be the electrostatic haptic actuator 400 illustrated in FIG. 4. The first, second, and third electrodes 410, 420, 430 may have the same or substantially the same surface area footprint as the 8" touch screen. When a user touches the touch screen, the touch sensor senses the touch as an input and sends a signal to the controller 330. The controller 330 processes the signal and outputs signals to the power supply 440 and/or the switch 460 to turn on the power supply 440, if the power supply 440 is not already turned on, and to close the switch 460 to complete the circuit. As described above, the positive charges on the first and third electrodes 410, 430 and the negative charge on the second electrode 420 create attractive forces between the first and second electrodes 410, 420, and the second and third electrodes 420, 430, which cause movement of the electrodes toward each other. The controller 330 may then remove the signal(s) and/or send another signal to the switch 460 to move to the open position (and/or to the power supply 440 to turn off). In response, the resilient materials 412, 422 between the electrodes 410, 420 430 cause the electrodes 410, 420, 430 to return to their respective initial, "rest" positions. The actuation of the electrostatic haptic actuator 400 may be repeated to create the desired vibrational haptic effect.

Figure 6:
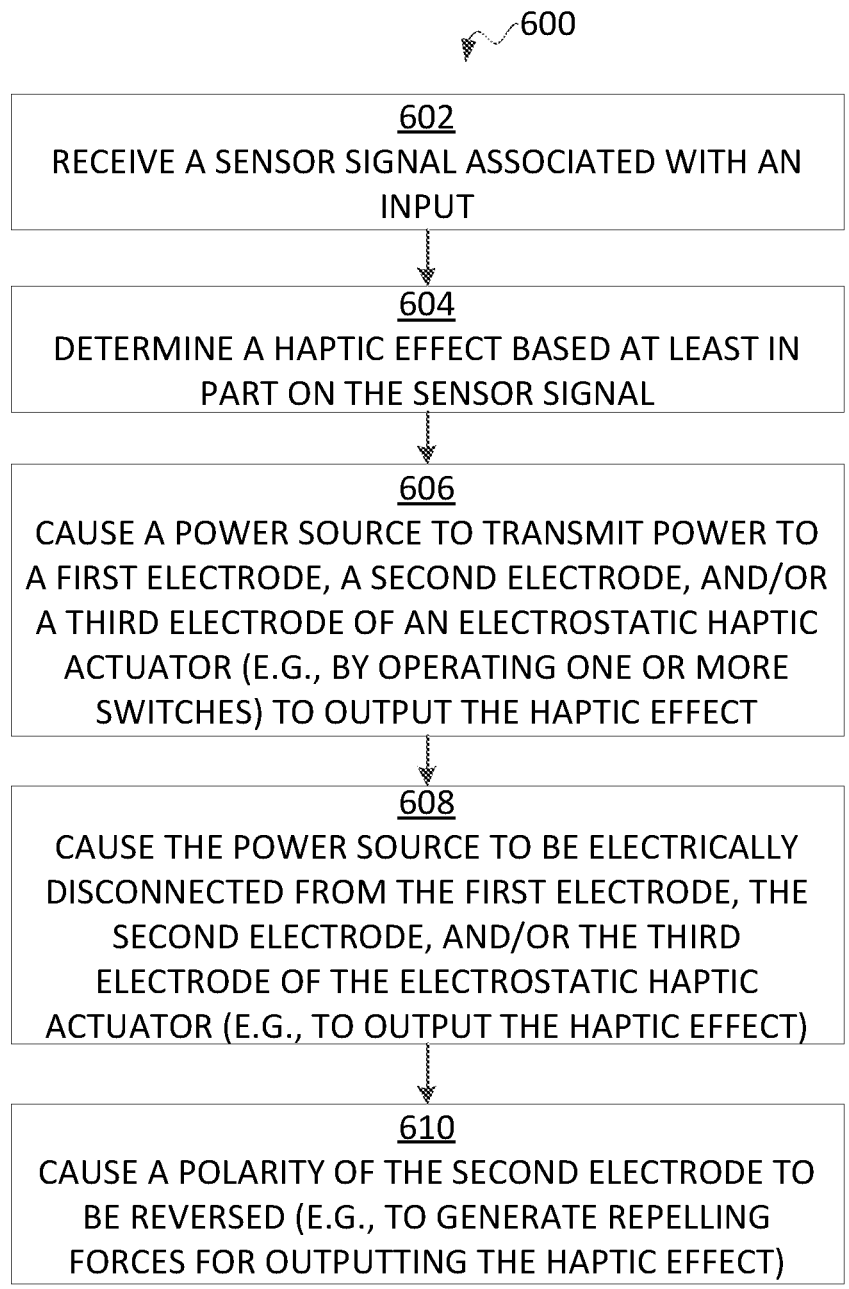
FIG. 6 is a flow chart of steps for performing a method for providing an electrostatic haptic actuator and a user interface with an electrostatic haptic actuator according to an embodiment.

Illustrative Methods for an Electrostatic Haptic
Actuator and User Interface with an Electrostatic
Haptic Actuator FIG. 6 is a flow chart of steps for performing a method for providing haptically-enabled curved devices according to an embodiment. In some embodiments, the steps in FIG. 6 may be implemented in program code that is executed by a processor, for example, the processor in a general purpose computer, a mobile device, or a server. In an embodiment, these steps may be implemented by a group of processors. In an embodiment, one or more steps shown in FIG. 6 may be omitted or performed in a different order. Similarly, in some embodiments, additional steps not shown in FIG. 6 may also be performed. The steps below are described with reference to components described above with regard FIGS. 1-2.

The method 600 begins at step 602 when the controller 120 receives a sensor signal associated with an input (e.g., a user input) from an input/output device 110. For example, the touch sensor 150 may detect an object contacting an associated touch-sensitive surface, such as an associated touch-screen display, and transmit the sensor signal to the controller 120. In an embodiment, the controller 120 can use an input determination module 124 to receive the sensor signal and/or determine an input intended by the user based on the sensor signal.

The method 600 continues at step 604 when the controller 120 determines a haptic effect based at least in part on the sensor signal. In an embodiment, the controller 120 can use a haptic effect determination module 126 to determine the haptic effect. In an embodiment, the controller 120 can determine the haptic effect based at least in part on the sensor signal. For example, the controller 120 can determine the input associated with the sensor signal. The controller 120 can then map the input to a particular haptic effect using a lookup table, and/or can determine the particular haptic effect at least in part by using an algorithm.

The method 600 continues at step 606 when the controller 120 causes a power source to transmit power to a first electrode, a second electrode, and/or a third electrode of an electrostatic haptic actuator (e.g., to output the haptic effect).

In an embodiment, the controller 120 operates one or more switches to cause the power source to transmit the power to the first electrode, second electrode, and/or third electrode.

For example, the controller 120 may operate a first switch electrically coupled between the power supply and the first electrode to cause power to be transmitted to the first electrode. The controller 120 can operate the first switch by transmitting a first signal to the first switch configured to toggle the first switch between open and closed positions. As another example, the controller 120 may operate a second switch electrically coupled between the power supply and the third electrode to cause power to be transmitted to the third electrode. The controller 120 can operate the second switch by transmitting a second signal to the second switch configured to toggle the second switch between open and closed positions. The controller 120 can transmit any number of signals to any number of switches to operate the electrostatic haptic actuator.

The method 600 continues at step 608 when the controller 120 causes the power source to be electrically disconnected from the first electrode, the second electrode, and/or the third electrode of the electrostatic haptic actuator (e.g., to output the haptic effect). For example, the controller 120 may operate a first switch electrically coupled between the power supply and the first electrode to cause the power supply to be electrically disconnected from the first electrode. The controller 120 can operate the first switch by transmitting a first signal to the first switch configured to toggle the first switch, for example, from an open position to a closed position. As another example, the controller 120 may operate a second switch electrically coupled between the power supply and the third electrode to cause the power supply to be electrically disconnected from the third electrode. The controller 120 can operate the second switch by transmitting a second signal to the second switch configured to toggle the second switch, for example, from a closed position to an open position.

The method 600 continues at step 608 when the controller 120 causes a polarity of the second electrode to be reversed. This may generate repelling forces between the first electrode and the second electrode, and/or between the second electrode and the third electrode. The repelling forces may cause the first electrode and/or the third electrode to move away from the second electrode. A user may perceive the movement as at least a portion of a haptic effect.

In an embodiment, the controller 120 operates the power supply to cause the polarity of the second electrode to be reversed. For example, the controller 120 can transmit a signal to the power supply configured to cause the power supply to generate a reversed polarity at the second electrode. In another embodiment, the controller 120 transmits a signal to another electrical component, such as a processing device or an integrated circuit (IC) component, configured to cause the polarity of the second electrode to be reversed. For example, an electrical component can be electrically coupled between the power supply and the second electrode. The electrical component may be configured to receive a power signal from the power supply and, in response to the signal from the controller 120, invert the power signal or otherwise modify the power signal to generate the reversed polarity at the second electrode.

Advantages of Electrostatic Haptic Actuators and
User Interfaces with Electrostatic Haptic Actuators Embodiments may have more total electrode surface-area than other haptic output devices (e.g., conventional electrostatic actuators that have two or fewer electrodes). Embodiments may also space electrodes more closely together than other haptic output devices, for example, due to the increased number of electrodes. The increased total electrode surface-area, combined with the closer spacing between electrodes, may reduce both the packaging size and voltage needed to achieve the same force output by other haptic output devices. Thus, embodiments may output similar or greater forces than other haptic output devices, while using less power and taking up less space.

For example, embodiments may provide haptic output devices that are relatively thin and use less power that other types of haptic output devices, as power is only used as the electrodes/plates are charged and discharged. Embodiments may provide improved levels of efficiency over conventional electrostatic actuators. For example, an electrostatic actuator with three electrodes/plates in accordance with embodiments may generate up to eight times the force as a conventional electrostatic actuator that only includes two electrodes, as the gap between the electrodes in accordance with embodiments may be halved, while doubling the surface area of the electrodes.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A device comprising:
an electrostatic haptic actuator comprising:
a first electrode,
a second electrode that is separate from the first electrode,
a first insulation layer between the first electrode and the second electrode,
a first resilient material between the first electrode and the second electrode,
a third electrode that is separate from the first electrode and the second electrode,
a second insulation layer between the second electrode and the third electrode, wherein the second insulation layer is separate from the first insulation layer; and
a second resilient material between the second electrode and the third electrode, wherein the second resilient material is separate from the first resilient material;
a power supply operatively connected to the first electrode, the second electrode, and the third electrode for generating a first polarity on the first and third electrodes and a second polarity that is opposite the first polarity on the second electrode; and
a controller in signal communication with the power supply or with a switch, the controller being configured to cause the power supply to be electrically connected to the first electrode, the second electrode, and the third electrode to generate a first attractive force between the first electrode and the second electrode, and a second attractive force between the second electrode and the third electrode.

2. The device of claim 1, wherein each of the first insulation layer and the second insulation layer comprises a dielectric material.

3. The device of claim 2, wherein the first insulation layer comprises the first resilient material, and the second insulation layer comprises the second resilient material.

4. The device of claim 1, wherein the first insulation layer comprises the first resilient material, and the second insulation layer comprises the second resilient material.

5. The device of claim 1, wherein the controller is configured to cause the power supply to be electrically disconnected from the first electrode, the second electrode, and the third electrode, and wherein in response to the power supply being electrically disconnected from the first electrode, the second electrode, and the third electrode, the first resilient material is configured to move the first electrode and the second electrode to respective initial positions and the second resilient material is configured to move the second electrode and the third electrode to respective initial positions.

6. The device of claim 1, wherein the switch comprises a first switch electrically coupled between the power supply and the first electrode and a second switch electrically coupled between the power supply and the third electrode, and wherein the controller is in signal communication with the first switch and the second switch.

7. The device of claim 6, wherein the controller is configured to send a first signal to the first switch to close the first switch before sending a second signal to the second switch to close the second switch.

8. The device of claim 1, wherein the controller is configured to cause a polarity of the second electrode to be reversed to generate repelling forces between the first electrode and the second electrode and between the second electrode and the third electrode.

9. The device of claim 1, further comprising a touch sensor in signal communication with the controller and configured to sense an input and transmit a signal associated with the input, wherein the controller is configured to cause the power supply to be electrically connected to the first electrode, the second electrode, and the third electrode to generate the first attractive force and the second attractive force in response to receiving the signal from the touch sensor.

10. The device of claim 1, wherein the first resilient material is formed from a different type of material than the second resilient material.

11. The device of claim 1, wherein the first resilient material has a first spring constant and the second resilient material has a second spring constant that is different from the first spring constant.

12. The device of claim 1, wherein the first resilient material comprises:
a first resilient component positioned at a first location between the first electrode and the second electrode; and
a second resilient component positioned at a second location between the first electrode and the second electrode, the second location being different than the first location.

13. An electrostatic haptic actuator comprising:
a first electrode;
a second electrode that is separate from the first electrode;
a first insulation layer between the first electrode and the second electrode;
a first resilient material between the first electrode and the second electrode;
a third electrode that is separate from the first electrode and the second electrode;
a second insulation layer between the second electrode and the third electrode, wherein the second insulation layer is separate from the first insulation layer; and
a second resilient material between the second electrode and the third electrode, wherein the second resilient material is separate from the first resilient material;
wherein the first electrode and the third electrode are configured to receive power from a power supply and responsively generate a first polarity, and the second electrode is configured to receive power from the power supply and responsively generate a second polarity that is opposite the first polarity such that the first polarity and the second polarity generate a first attractive force between the first electrode and the second electrode and a second attractive force between the second electrode and the third electrode.

14. The electrostatic haptic actuator according to claim 13, wherein each of the first insulation layer and the second insulation layer comprises a dielectric material.

15. The electrostatic haptic actuator according to claim 14, wherein the first insulation layer comprises the first resilient material, and the second insulation layer comprises the second resilient material.

16. The electrostatic haptic actuator according to claim 13, wherein the first insulation layer comprises the first resilient material, and the second insulation layer comprises the second resilient material.

17. The electrostatic haptic actuator according to claim 13, further comprising a controller in signal communication with the power supply or a switch, the controller being configured to cause the power supply to be electrically connected to the first electrode, the second electrode, and the third electrode.

18. The electrostatic haptic actuator according to claim 17, wherein the controller is configured to cause the power supply to be electrically disconnected from the first electrode, the second electrode, and the third electrode, and wherein in response to the power supply being electrically disconnected from the first electrode, the second electrode, and the third electrode, the first resilient material is configured to move the first electrode and the second electrode to respective initial positions and the second resilient material is configured to move the second electrode and the third electrode to respective initial positions.

19. The electrostatic haptic actuator according to claim 18, wherein the switch comprises a first switch electrically coupled between the power supply and the first electrode and a second switch electrically coupled between the power supply and the third electrode, and wherein the controller is in signal communication with the first switch and the second switch.

20. The electrostatic haptic actuator according to claim 19, wherein the controller is configured to send a first signal to the first switch to close the first switch before sending a second signal to the second switch to close the second switch.

21. The electrostatic haptic actuator according to claim 17, wherein the controller is configured to cause a polarity of the second electrode to be reversed to generate repelling forces between the first electrode and the second electrode and between the second electrode and the third electrode.

22. The electrostatic haptic actuator according to claim 13, further comprising the power supply operatively connected to the first electrode, the second electrode, and the third electrode for generating the first polarity on the first and third electrodes and the second polarity on the second electrode.

23. A method comprising:
receiving, by a controller and from a touch sensor, a sensor signal associated with an input;
determining, by the controller, a haptic effect based at least in part on the sensor signal; and
causing, by the controller, a power source to transmit power to a first electrode, a second electrode, and a third electrode of an electrostatic haptic actuator, the power configured to cause the electrostatic haptic actuator to output the haptic effect at least in part by generating a first attractive force between the first electrode and the second electrode and a second attractive force between the second electrode and the third electrode for generating the haptic effect;
wherein the first electrode is separate from the second electrode, and the third electrode is separate from the first electrode and the second electrode; and
wherein the electrostatic haptic actuator comprises:
a first insulation layer positioned between the first electrode and the second electrode;
a first resilient material positioned between the first electrode and the second electrode;
a second insulation layer positioned between the second electrode and the third electrode; and
a second resilient material positioned between the second electrode and the third electrode.

24. The method according to claim 23, wherein each of the first insulation layer and the second insulation layer comprises a dielectric material.

25. The method according to claim 24, wherein the first insulation layer comprises the first resilient material, and the second insulation layer comprises the second resilient material.

26. The method according to claim 23, wherein the first insulation layer comprises the first resilient material, and the second insulation layer comprises the second resilient material.

27. The method according to claim 23, further comprising causing the power source to be electrically disconnected from the electrostatic haptic actuator,
wherein the first resilient material is configured to move the first electrode and the second electrode to respective initial positions and the second resilient material is configured to move the second electrode and the third electrode to respective initial positions in response to the power source being electrically disconnected from the electrostatic haptic actuator.

28. The method of claim 23, wherein causing the power source to transmit power to the first electrode comprises operating a first switch electrically coupled between the power source and the first electrode, and wherein causing the power source to transmit power to the third electrode comprising operating a second switch electrically coupled between the power source and the third electrode.

29. The method of claim 28, wherein operating the first switch and the second switch comprises transmitting a first signal to the first switch to close the first switch before sending a second signal to the second switch to close the second switch.

30. The method of claim 23, further comprising causing a polarity of the second electrode to be reversed to generate repelling forces between the first electrode and the second electrode and between the second electrode and the third electrode.

\* \* \* \* \*